United States Patent
Mighall et al.

(10) Patent No.: US 12,127,899 B2
(45) Date of Patent: *Oct. 29, 2024

(54) CLEANING APPLIANCE

(71) Applicant: Dyson Technology Limited, Wiltshire (GB)

(72) Inventors: Scott James Mighall, Swindon (GB); Christopher Graham Vincent, Swindon (GB); Johnathan George Marsh, Swindon (GB); Sammantha Stephanie Harris, Swindon (GB); Boris Zukina, Bristol (GB); Michael Graham Probert, Bristol (GB); Christopher Daniel Currer Wilkinson, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 331 days.

This patent is subject to a terminal disclaimer.

(21) Appl. No.: 17/674,332

(22) Filed: Feb. 17, 2022

(65) Prior Publication Data

US 2022/0168083 A1   Jun. 2, 2022

Related U.S. Application Data

(63) Continuation of application No. 15/793,337, filed on Oct. 25, 2017, now Pat. No. 11,284,979.

(30) Foreign Application Priority Data

Oct. 26, 2016 (GB) .................................... 1618073

(51) Int. Cl.
*A61C 17/22* (2006.01)
*A46B 11/00* (2006.01)
(Continued)

(52) U.S. Cl.
CPC ........ *A61C 17/227* (2013.01); *A46B 11/0062* (2013.01); *A46B 13/04* (2013.01);
(Continued)

(58) Field of Classification Search
CPC .............. A46B 11/063; A46B 11/0017; A46B 11/0096; A46B 11/0062; A46B 13/04;
(Continued)

(56) References Cited

U.S. PATENT DOCUMENTS 1,691,523 A   11/1928   Maycen
2,766,472 A   10/1956   Durrett
(Continued)

FOREIGN PATENT DOCUMENTS

CA   2762842 A1   11/2010
CN   2580827 Y    10/2003
(Continued)

OTHER PUBLICATIONS

Office Action received for Chinese Patent Application No. 202210064903.0, mailed on Jul. 13, 2023, 20 pages (12 pages of English Translation and 8 pages of Original Document).
(Continued)

*Primary Examiner* — Ralph A Lewis
*Assistant Examiner* — Mirayda A Aponte
(74) *Attorney, Agent, or Firm* — Tucker Ellis LLP

(57) ABSTRACT

A dental cleaning appliance includes a fluid reservoir for storing working fluid, a nozzle for delivering working fluid to the teeth of a user, a light source for illuminating the fluid reservoir and a control circuit for activating the light source to generate an alert which is conveyed to the user through the illumination of the fluid reservoir.

21 Claims, 9 Drawing Sheets

(51) Int. Cl.
  *A46B 13/04* (2006.01)
  *A46B 15/00* (2006.01)
  *A61C 17/02* (2006.01)
  *A61C 17/28* (2006.01)
  *A61C 17/36* (2006.01)

(52) U.S. Cl.
  CPC ...... *A46B 15/0004* (2013.01); *A46B 15/0036* (2013.01); *A46B 15/0044* (2013.01); *A61C 17/0202* (2013.01); *A61C 17/222* (2013.01); *A61C 17/28* (2013.01); *A61C 17/36* (2013.01); *A46B 15/0034* (2013.01); *A46B 2200/1066* (2013.01)

(58) Field of Classification Search
  CPC ............ A46B 15/0036; A46B 15/0004; A46B 15/0044; A46B 15/0034; A46B 2200/1066; A61C 17/28; A61C 17/36; A61C 17/227; A61C 17/0202; A61C 17/222; A61C 1/088; A61L 2/10
  USPC .......................................................... 433/29
  See application file for complete search history.

(56) References Cited

U.S. PATENT DOCUMENTS

| | | |
|---|---|---|
| 3,195,537 A | 7/1965 | Blasi |
| 3,235,897 A | 2/1966 | Fortenberry |
| 3,667,454 A | 6/1972 | Prince |
| 3,903,625 A | 9/1975 | Augustine |
| 4,315,741 A | 2/1982 | Reichl |
| 4,779,173 A | 10/1988 | Carr et al. |
| 4,845,796 A | 7/1989 | Mosley |
| 4,961,698 A | 10/1990 | Vlock |
| 4,978,297 A | 12/1990 | Vlock |
| 5,115,533 A | 5/1992 | Hukuba |
| 5,218,956 A | 6/1993 | Handler et al. |
| 5,339,479 A | 8/1994 | Lyman |
| 5,372,501 A | 12/1994 | Shalvi |
| 5,393,153 A | 2/1995 | Bouthillier et al. |
| 5,561,881 A | 10/1996 | Klinger et al. |
| 5,673,451 A | 10/1997 | Moore et al. |
| 5,704,087 A | 1/1998 | Strub |
| 5,784,742 A | 7/1998 | Giuliani et al. |
| 5,815,872 A | 10/1998 | Meginniss et al. |
| 5,876,207 A | 3/1999 | Sundius et al. |
| 5,918,995 A | 7/1999 | Puurunen |
| 6,026,828 A | 2/2000 | Altshuler |
| 6,029,304 A | 2/2000 | Hulke et al. |
| 6,047,429 A | 4/2000 | Wu |
| 6,155,824 A | 12/2000 | Kamen et al. |
| 6,164,967 A | 12/2000 | Sale et al. |
| 6,202,242 B1 | 3/2001 | Salmon et al. |
| 6,402,410 B1 | 6/2002 | Hall et al. |
| 6,536,979 B1 | 3/2003 | Kenny et al. |
| 6,599,126 B1 | 7/2003 | Sale et al. |
| 6,606,755 B1 | 8/2003 | Robinson et al. |
| 6,689,078 B1 | 2/2004 | Rehkemper et al. |
| 6,739,782 B1 | 5/2004 | Rehkemper et al. |
| 6,766,549 B2 | 7/2004 | Klupt |
| 7,080,980 B2 | 7/2006 | Klupt |
| 7,596,827 B1 | 10/2009 | Puneet |
| 7,896,567 B2 | 3/2011 | Burrowes |
| 8,287,203 B2 | 10/2012 | Gruber et al. |
| 8,430,590 B2 | 4/2013 | Boland et al. |
| 8,522,384 B2 | 9/2013 | Leung |
| 8,651,340 B2 | 2/2014 | Lelieveld et al. |
| 8,904,590 B2 | 12/2014 | Jungnickel |
| 9,144,298 B2 | 9/2015 | Fattori |
| 9,700,129 B2 | 7/2017 | Follows et al. |
| 9,743,749 B2 | 8/2017 | Follows et al. |
| 9,839,284 B2 | 12/2017 | Follows et al. |
| 11,109,950 B2 | 9/2021 | Wood et al. |
| 11,284,979 B2 * | 3/2022 | Mighall ............ A46B 15/0036 |
| 2002/0004817 A1 | 1/2002 | Pham et al. |
| 2002/0044817 A1 | 4/2002 | Hall et al. |
| 2002/0100134 A1 | 8/2002 | Dunn et al. |
| 2002/0129454 A1 | 9/2002 | Hilscher et al. |
| 2002/0133308 A1 | 9/2002 | Lundell et al. |
| 2002/0152565 A1 | 10/2002 | Klupt |
| 2003/0056307 A1 | 3/2003 | Tybinkowski et al. |
| 2003/0131427 A1 | 7/2003 | Hilscher et al. |
| 2003/0205492 A1 | 11/2003 | Ferber et al. |
| 2004/0060138 A1 | 4/2004 | Pfenniger et al. |
| 2004/0143920 A1 | 7/2004 | Nanda |
| 2005/0004498 A1 | 1/2005 | Klupt |
| 2005/0034256 A1 | 2/2005 | Kemp et al. |
| 2005/0050658 A1 | 3/2005 | Chan et al. |
| 2005/0104556 A1 | 5/2005 | Pfenniger et al. |
| 2005/0238612 A1 | 10/2005 | Jacobs et al. |
| 2005/0254992 A1 | 11/2005 | Jenkins et al. |
| 2005/0271997 A1 | 12/2005 | Mikami et al. |
| 2006/0037158 A1 | 2/2006 | Foley et al. |
| 2006/0130253 A1 | 6/2006 | Rycroft |
| 2006/0150419 A1 | 7/2006 | Gruber et al. |
| 2006/0292521 A1 | 12/2006 | Hegemann |
| 2007/0039109 A1 | 2/2007 | Nanda |
| 2007/0041779 A1 | 2/2007 | Kuo |
| 2007/0080240 A1 | 4/2007 | Schuetz |
| 2007/0094822 A1 | 5/2007 | Gatzemeyer et al. |
| 2007/0190509 A1 | 8/2007 | Kim |
| 2008/0008979 A1 | 1/2008 | Thomas et al. |
| 2008/0060148 A1 | 3/2008 | Pinyayev et al. |
| 2008/0109973 A1 | 5/2008 | Farrell et al. |
| 2008/0141476 A1 | 6/2008 | Gatzemeyer et al. |
| 2008/0196185 A1 | 8/2008 | Gatzemeyer et al. |
| 2008/0250591 A1 | 10/2008 | Nanda |
| 2008/0313829 A1 | 12/2008 | Dabrowski |
| 2009/0064429 A1 | 3/2009 | Hall et al. |
| 2009/0064430 A1 | 3/2009 | Jimenez et al. |
| 2009/0136285 A1 | 5/2009 | Hall et al. |
| 2009/0144919 A1 | 6/2009 | Nanda |
| 2009/0148808 A1 | 6/2009 | Alexander et al. |
| 2009/0183689 A1 | 7/2009 | Moore et al. |
| 2009/0291422 A1 | 11/2009 | Puurunen et al. |
| 2009/0305187 A1 | 12/2009 | Janssen et al. |
| 2009/0307859 A1 | 12/2009 | Mottram et al. |
| 2009/0313778 A1 | 12/2009 | Wong et al. |
| 2009/0320231 A1 | 12/2009 | Rosenzweig et al. |
| 2010/0223742 A1 | 9/2010 | Kang |
| 2010/0269276 A1 | 10/2010 | Faranda et al. |
| 2010/0281636 A1 | 11/2010 | Ortins et al. |
| 2010/0325822 A1 | 12/2010 | Hilscher et al. |
| 2010/0325828 A1 | 12/2010 | Braun et al. |
| 2011/0010876 A1 | 1/2011 | Wahori et al. |
| 2011/0027749 A1 | 2/2011 | Syed |
| 2011/0056033 A1 | 3/2011 | Iwahori et al. |
| 2011/0146015 A1 | 6/2011 | Moskovich et al. |
| 2011/0146016 A1 | 6/2011 | Gatzemeyer et al. |
| 2011/0184427 A1 | 7/2011 | Mcclure |
| 2011/0225858 A1 | 9/2011 | Glassman et al. |
| 2011/0247158 A1 | 10/2011 | Jungnickel et al. |
| 2011/0275424 A1 | 11/2011 | Schmid et al. |
| 2011/0314677 A1 | 12/2011 | Meier et al. |
| 2012/0066848 A1 | 3/2012 | Klemm et al. |
| 2012/0110763 A1 | 5/2012 | Jungnickel et al. |
| 2012/0137454 A1 | 6/2012 | Huy et al. |
| 2012/0156641 A1 | 6/2012 | Wada et al. |
| 2012/0183926 A1 | 7/2012 | Shalev |
| 2012/0189976 A1 | 7/2012 | Mcdonough et al. |
| 2012/0266396 A1 | 10/2012 | Leung |
| 2012/0301209 A1 | 11/2012 | Fattori |
| 2013/0045457 A1 | 2/2013 | Chetiar et al. |
| 2013/0122453 A1 | 5/2013 | Paxton et al. |
| 2013/0125327 A1 | 5/2013 | Schmid et al. |
| 2013/0174366 A1 | 7/2013 | Stebila et al. |
| 2013/0177863 A1 | 7/2013 | Shreve |
| 2013/0205528 A1 | 8/2013 | Jungnickel et al. |
| 2013/0311321 A1 | 11/2013 | Gatzemeyer et al. |
| 2014/0007361 A1 | 1/2014 | Nazaroff et al. |
| 2014/0033034 A1 | 1/2014 | Patel |
| 2014/0096332 A1 | 4/2014 | Kitagawa et al. |
| 2014/0123420 A1 | 5/2014 | Nanda |

(56) References Cited

U.S. PATENT DOCUMENTS

| | | |
|---|---|---|
| 2014/0134568 A1 | 5/2014 | Heinrich et al. |
| 2014/0259474 A1 | 9/2014 | Sokol et al. |
| 2014/0304932 A1 | 10/2014 | Patel |
| 2014/0315142 A1 | 10/2014 | Montgomery |
| 2014/0332028 A1 | 11/2014 | Tran |
| 2015/0013088 A1 | 1/2015 | Li |
| 2015/0044629 A1 | 2/2015 | Wang et al. |
| 2015/0147717 A1 | 5/2015 | Taylor et al. |
| 2015/0230899 A1 | 8/2015 | Vetter et al. |
| 2015/0313353 A1 | 11/2015 | Schmalhurst et al. |
| 2015/0335144 A1 | 11/2015 | Patel |
| 2015/0335145 A1 | 11/2015 | Bloch et al. |
| 2015/0342337 A1 | 12/2015 | Bloch |
| 2016/0045020 A1 | 2/2016 | Belge-Barnes |
| 2016/0081465 A1 | 3/2016 | Metter |
| 2016/0296003 A1 | 10/2016 | Beckerman et al. |
| 2016/0317267 A1 | 11/2016 | Meerbeek et al. |
| 2016/0324595 A1 | 11/2016 | Benning |
| 2016/0331114 A1 | 11/2016 | Follows et al. |
| 2016/0331115 A1 | 11/2016 | Follows et al. |
| 2016/0331116 A1 | 11/2016 | Follows et al. |
| 2016/0331497 A1 | 11/2016 | Follows et al. |
| 2016/0331498 A1 | 11/2016 | Follows et al. |
| 2016/0338807 A1 | 11/2016 | Bloch et al. |
| 2017/0042638 A1 | 2/2017 | Lee |
| 2017/0056142 A1 | 3/2017 | Baragona et al. |
| 2017/0079419 A1 | 3/2017 | Wu et al. |
| 2017/0318951 A1 | 11/2017 | Taghvai |
| 2018/0028296 A1 | 2/2018 | Lee |
| 2018/0055212 A1 | 3/2018 | Follows et al. |
| 2018/0078350 A1 | 3/2018 | Zachar et al. |
| 2018/0084898 A1 | 3/2018 | Vincent et al. |
| 2018/0085207 A1 | 3/2018 | Tweedie et al. |
| 2018/0110322 A1 | 4/2018 | Marsh et al. |
| 2018/0110601 A1 | 4/2018 | Mighall et al. |
| 2019/0082819 A1 | 3/2019 | Katano et al. |
| 2021/0113314 A1 | 4/2021 | Ford et al. |
| 2021/0274923 A1 | 9/2021 | Ford et al. |
| 2021/0275283 A1 | 9/2021 | Davies et al. |

FOREIGN PATENT DOCUMENTS

| | | |
|---|---|---|
| CN | 2832460 Y | 11/2006 |
| CN | 101683288 A | 3/2010 |
| CN | 201624284 U | 11/2010 |
| CN | 201668525 U | 12/2010 |
| CN | 102215777 A | 10/2011 |
| CN | 202020561 U | 11/2011 |
| CN | 202143656 U | 2/2012 |
| CN | 102596096 A | 7/2012 |
| CN | 102740731 A | 10/2012 |
| CN | 202526334 U | 11/2012 |
| CN | 102846393 A | 1/2013 |
| CN | 103347417 A | 10/2013 |
| CN | 103783811 A | 5/2014 |
| CN | 103876450 A | 6/2014 |
| CN | 103990211 A | 8/2014 |
| CN | 104408840 A | 3/2015 |
| CN | 104433793 A | 3/2015 |
| CN | 104523345 A | 4/2015 |
| CN | 104720914 A | 6/2015 |
| CN | 204411007 U | 6/2015 |
| CN | 204542423 U | 8/2015 |
| CN | 104921830 A | 9/2015 |
| CN | 105146906 A | 12/2015 |
| CN | 105455913 A | 4/2016 |
| CN | 105581505 A | 5/2016 |
| CN | 105640662 A | 6/2016 |
| CN | 205307131 U | 6/2016 |
| CN | 105813595 A | 7/2016 |
| CN | 205359687 U | 7/2016 |
| CN | 105943179 A | 9/2016 |
| CN | 106109041 A | 11/2016 |
| CN | 106137433 A | 11/2016 |
| CN | 106455802 A | 2/2017 |
| CN | 106691614 A | 5/2017 |
| CN | 107088103 A | 8/2017 |
| CN | 107865707 A | 4/2018 |
| CN | 107874860 A | 4/2018 |
| CN | 207253069 U | 4/2018 |
| CN | 108013941 A | 5/2018 |
| CN | 108042233 A | 5/2018 |
| CN | 108125377 A | 6/2018 |
| CN | 208926670 U | 6/2019 |
| CN | 111839783 A | 10/2020 |
| DE | 0099427 | 9/1897 |
| DE | 1632384 A1 | 6/1971 |
| DE | 2209562 A1 | 9/1973 |
| DE | 2901136 A1 | 7/1980 |
| DE | 8134787 U1 | 5/1983 |
| DE | 8610513 U1 | 7/1986 |
| DE | 3724476 A1 | 1/1989 |
| DE | 4029770 A1 | 3/1992 |
| DE | 9417795 U1 | 1/1995 |
| DE | 69021971 T2 | 5/1996 |
| DE | 29520454 U1 | 4/1997 |
| DE | 29703210 U1 | 4/1997 |
| DE | 19541429 A1 | 5/1997 |
| DE | 29807736 U1 | 11/1998 |
| DE | 29904059 U1 | 5/1999 |
| DE | 20018077 U1 | 1/2001 |
| DE | 10023725 A1 | 11/2001 |
| DE | 20209014 U1 | 9/2002 |
| DE | 20216413 U1 | 1/2003 |
| DE | 202004004628 U1 | 7/2004 |
| DE | 10347258 A1 | 5/2005 |
| DE | 202005015767 U1 | 1/2006 |
| DE | 202005019681 U1 | 4/2006 |
| DE | 102006005205 A1 | 9/2006 |
| DE | 102005014095 A1 | 10/2006 |
| DE | 102005045226 A1 | 3/2007 |
| DE | 202009013323 U1 | 3/2010 |
| DE | 202014003540 U1 | 7/2014 |
| DE | 202014009678 U1 | 1/2015 |
| EA | 000234 B1 | 2/1999 |
| EP | 0494878 A1 | 7/1992 |
| EP | 0634151 A2 | 1/1995 |
| EP | 1367957 A1 | 12/2003 |
| EP | 1657485 A1 | 5/2006 |
| EP | 2218559 A1 | 8/2010 |
| EP | 2229917 A1 | 9/2010 |
| EP | 2253359 A1 | 11/2010 |
| EP | 2253360 A1 | 11/2010 |
| EP | 2468213 A1 | 6/2012 |
| EP | 2528471 B1 | 11/2017 |
| ES | 1141731 U | 7/2015 |
| FR | 0341238 A | 8/1904 |
| FR | 2790383 A1 | 9/2000 |
| GB | 2290702 A | 1/1996 |
| GB | 2406503 A | 4/2005 |
| GB | 2538300 A | 11/2016 |
| GB | 2538302 A | 11/2016 |
| GB | 2538304 A | 11/2016 |
| GB | 2555417 A | 5/2018 |
| JP | 62-102433 A | 5/1987 |
| JP | 05-018516 U | 3/1993 |
| JP | 05-237014 A | 9/1993 |
| JP | 07-148020 A | 6/1995 |
| JP | 2531600 B2 | 9/1996 |
| JP | 10-113230 A | 5/1998 |
| JP | 11-103937 A | 4/1999 |
| JP | 2000-201740 A | 7/2000 |
| JP | 2003-304933 A | 10/2003 |
| JP | 2004-222839 A | 8/2004 |
| JP | 2006-061486 A | 3/2006 |
| JP | 2007-014730 A | 1/2007 |
| JP | 2007-516029 A | 6/2007 |
| JP | 2007-518439 A | 7/2007 |
| JP | 2009-129543 A | 6/2009 |
| JP | 2009-268828 A | 11/2009 |
| JP | 2010-527717 A | 8/2010 |
| JP | 2012-086022 A | 5/2012 |
| JP | 2012-135567 A | 7/2012 |
| JP | 2012-161368 A | 8/2012 |

(56) References Cited

FOREIGN PATENT DOCUMENTS

| | | | |
|---|---|---|---|
| JP | 2012-521787 A | 9/2012 |
| JP | 2014-200297 A | 10/2014 |
| JP | 2015-163091 A | 9/2015 |
| JP | 2016-214844 A | 12/2016 |
| JP | 2017-164214 A | 9/2017 |
| KR | 10-2007-0000108 A | 1/2007 |
| KR | 10-2010-0025434 A | 3/2010 |
| KR | 10-1242379 B1 | 3/2013 |
| KR | 10-2014-0049050 A | 4/2014 |
| KR | 10-1594087 B1 | 2/2016 |
| KR | 10-1646053 B1 | 8/2016 |
| RU | 2374967 C2 | 12/2009 |
| RU | 2541432 C2 | 2/2015 |
| TW | M405308 U | 6/2011 |
| WO | 90/12557 A1 | 11/1990 |
| WO | 92/02159 A1 | 2/1992 |
| WO | 00/15076 A1 | 3/2000 |
| WO | 02/71971 A1 | 9/2002 |
| WO | 2004/021958 A1 | 3/2004 |
| WO | 2005/000541 A1 | 1/2005 |
| WO | 2006/098719 A1 | 9/2006 |
| WO | 2006/134514 A2 | 12/2006 |
| WO | 2007/008908 A1 | 1/2007 |
| WO | 2008/046580 A1 | 4/2008 |
| WO | 2010/055435 A1 | 5/2010 |
| WO | 2010/106524 A2 | 9/2010 |
| WO | 2011/094587 A1 | 8/2011 |
| WO | 2012/033553 A1 | 3/2012 |
| WO | 2014/141211 A1 | 9/2014 |
| WO | 2016/185166 A1 | 11/2016 |
| WO | 2016/201063 A2 | 12/2016 |
| WO | 2017/182301 A1 | 10/2017 |
| WO | 2018/083445 A1 | 5/2018 |
| WO | 2019/243761 A1 | 12/2019 |
| WO | 2019/243762 A1 | 12/2019 |
| WO | 2019/243765 A1 | 12/2019 |

OTHER PUBLICATIONS

Follows et al., U.S. Office Action dated Mar. 12, 2019, directed to U.S. Appl. No. 15/804,284; 9 pages.

Follows et al., U.S. Office Action mailed Apr. 6, 2017, directed to U.S. Appl. No. 15/152,116; 16 pages.

International Search Report and Written Opinion dated Jul. 1, 2019, directed to PCT Application No. PCT/GB2019/051129; 11 pages.

International Search Report and Written Opinion dated Jul. 2, 2019, directed to International Application No. PCT/GB2019/051124; 11 pages.

International Search Report and Written Opinion mailed Dec. 21, 2017, directed to International Application No. PCT/GB2017/053137; 12 pages.

Marsh et al., U.S. Office Action mailed Apr. 29, 2019, directed to U.S. Appl. No. 15/793,498; 13 pages.

Notice of Reasons for Rejection dated Jan. 24, 2019, directed to JP Application No. 2017-205880; 9 pages.

Notification of Reason for Refusal dated Nov. 30, 2020, directed to KR Application No. 10-2019-7012757; 12 pages.

Notification of Reasons for Refusal received for Japanese Application No. 2020-569929, mailed on Nov. 30, X 2021, 3 pages (2 pages of English Translation and 1 page of Original Document).

Office Action dated Apr. 17, 2019, directed to CN Application No. 2017213981531; 9 pages.

Office Action received for Chinese Patent Application No. 201980040202.X, mailed on Aug. 5, 2021, 18 pages (11 pages of English Translation and 7 pages of Original Document).

Office Action received for Chinese Patent Application No. 201980040266.X, mailed on Aug. 4, 2021, 19 pages (11 pages of English Translation and 8 pages of Original Document).

Office Action received for Chinese Patent Application No. 201980040279.7, mailed on Jul. 6, 2021, 20 pages (11 pages of English Translation and 9 pages of Original Document).

Office Action received for Chinese Patent Application No. 201980040341.2, mailed on Jul. 29, 2021, 19 pages (11 pages of English Translation and 8 pages of Original Document).

Official Action dated Jan. 12, 2021, directed to RU Application No. 2019116082; 7 pages.

Rejection Decision dated Feb. 25, 2020, directed to CN Application No. 201711017458.8; 16 pages.

Search Report dated Mar. 23, 2017, directed to GB Application No. 1618073.9; 2 pages.

Search Report dated Nov. 29, 2018, directed to GB Application No. 1810144.4; 2 pages.

Search Report dated Nov. 30, 2018, directed to GB Application No. 1810149.3; 1 page.

Search Report dated Nov. 5, 2019, directed to GB Application No. 1910345.6; 1 page.

Search Report dated Nov. 5, 2019, directed to GB Application No. 1910347.2; 1 page.

* cited by examiner

CLEANING APPLIANCE

REFERENCE TO RELATED APPLICATIONS

This application is a continuation application of prior U.S. patent application Ser. No. 15/793,337, filed Oct. 25, 2017, which claims the priority of United Kingdom Application No. 1618073.9, filed Oct. 26, 2016, all of which are incorporated herein by reference in their entirety.

FIELD OF THE INVENTION

The present invention relates to a cleaning appliance. The cleaning appliance is preferably a handheld cleaning appliance, and is preferably a surface treating appliance. In preferred embodiments of the invention, the appliance is a dental cleaning appliance. In a preferred embodiment, the appliance is an electric toothbrush having a fluid delivery system for delivering a fluid to the teeth of the user. This fluid may be toothpaste, or a fluid for improved interproximal cleaning. Alternatively, the appliance may not include any bristles or other elements for brushing teeth, and may be in the form of a dedicated interproximal cleaning appliance. The invention also relates to a cleaning tool for use with a dental cleaning appliance, and to a handle for use with a dental cleaning appliance.

BACKGROUND OF THE INVENTION

Electric toothbrushes generally comprise a cleaning tool which is connected to a handle. The cleaning tool comprises a stem and a brush head bearing bristles for brushing teeth. The brush head comprises a static section which is connected to the stem, and at least one moveable section which is moveable relative to the static section, for example with one of a reciprocating, oscillating, vibrating, pivoting or rotating motion, to impart a brushing movement to bristles mounted thereon. The stem houses a drive shaft which couples with a transmission unit within the handle. The transmission unit is in turn connected to a motor, which is driven by a battery housed within the handle. The drive shaft and the transmission unit convert rotary or vibratory motion of the motor into the desired movement of the moveable section of the brush head relative to the static section of the brush head.

It is known to incorporate into an electric toothbrush an assembly for generating a jet of fluid for interproximal cleaning. For example, U.S. Pat. No. 8,522,384 describes an electric toothbrush in which the handle of the toothbrush defines a fluid chamber for storing a liquid such as water, and a slidable cover for enabling the fluid chamber to be accessed for replenishment by a user. A fluid path connects the fluid chamber to a nozzle located on a static portion of the brush head. A pump located within the fluid path is actuated upon user operation of an actuator on the handle to pump fluid from the fluid chamber to the nozzle for release under pressure from the nozzle.

Dental appliances often have one more LEDs located in, for example, a handle of the appliance for providing a user with an alert, for example relating to a charging status or a charge level of a battery of the appliance, and an on/off status of the appliance. These LEDs are often located behind relatively small windows disposed in the handle which are illuminated when the LEDs are activated. When the handle is being gripped by a user during use of the appliance, the illuminated LEDs may be difficult for the user to see, and may be obscured by a hand which is gripping the appliance.

SUMMARY OF THE INVENTION

In a first aspect, the present invention provides a dental cleaning appliance comprising a fluid reservoir for storing working fluid; a nozzle for delivering working fluid to the teeth of a user; a light source for illuminating at least part of the fluid reservoir; and a control circuit for activating the light source.

By illuminating at least a part of a fluid reservoir the surface area of the component of the appliance which provides the visual alert to the user can be significantly increased, improving the likelihood that the user will observe an alert generated by the control circuit and thus improving the overall user experience during use of the appliance. Utilizing part of the fluid reservoir to provide the visual alert to the user can also enable the appliance to be provided with a relatively large light emitting surface without significant component part or cost increases.

The appliance preferably comprises a handle and a stem extending between the handle and the nozzle, and the fluid reservoir is preferably connected to the stem. The fluid reservoir is preferably connected to a base section of the stem. The fluid reservoir preferably extends at least partially around, and more preferably surrounds, the stem.

A light pipe is preferably located within the handle for conveying light emitted from the light source towards the fluid reservoir. The handle preferably comprises a light emitting surface located on an end surface of the handle which faces the fluid reservoir. The fluid reservoir preferably covers the light emitting surface of the handle so that the light emitting surface of the handle is not exposed during use of the appliance, and so the user's eyes are not exposed directly to the light emitted from the light emitting surface of the handle.

The stem is preferably detachably connected to the handle. The handle preferably comprises a spigot to which the stem is detachably connected. The spigot is generally cylindrical in shape, and comprises an external cylindrical surface which preferably forms an interference fit with an inner surface of the stem. A light emitting surface of the handle may be located adjacent to, or on, the spigot. The handle may comprise an annular seat extending about the spigot for receiving the fluid reservoir. The annular seat preferably comprises the light emitting surface of the handle. The end surface of the handle is preferably concave in shape so that the end surface of the handle and the bottom wall of the fluid reservoir may have closely conforming shapes to minimize losses as the light passes from the handle to the fluid reservoir. The light emitting surface of the handle is preferably curved, and is preferably arc-shaped.

The nozzle, stem and fluid reservoir preferably form part of a cleaning tool which is detachably connected to the handle. This can allow the cleaning tool to be replaced, for example when a non-refillable fluid reservoir has become depleted, or when the nozzle of the appliance has become worn. This can also allow a different cleaning tool to be connected to the handle, for example for use by a different user.

In a second aspect, the present invention provides a dental cleaning appliance comprising a handle comprising a light source and a control circuit for activating the light source; and a cleaning tool detachably connected to the handle, the cleaning tool comprising a nozzle for delivering working fluid to the teeth of a user, a stem extending between the handle and the nozzle, and a fluid reservoir which is illuminated by the light source.

The control circuit is preferably arranged to activate the light source only when the cleaning tool, or stem, is mounted on the handle. The appliance may comprise an interlock which prevents the light source from being activated when the cleaning tool is not located on the handle. The interlock may comprise a magnet which is located in the cleaning tool, for example within the stem of the cleaning tool, and a sensor which is located within the handle and connected to the control circuit. The control circuit is preferably arranged to detect the presence of the cleaning tool on the handle from the variation in the magnetic field experienced by the sensor, and thus a variation in an output from the sensor.

The entire fluid reservoir may be illuminated by the light received from the light source. Alternatively, only a part of the fluid reservoir may be illuminated by the light received from the light source. In a preferred embodiment, the fluid reservoir comprises a first, upper housing part and a second, lower housing part. The first housing part is preferably formed from transparent material, and the second housing part is preferably formed from translucent material which is illuminated by the light received from the light source. The first housing part preferably comprises an upper section of an external wall of the fluid reservoir, and the second housing part preferably comprises a lower section of the external wall of the fluid reservoir. The upper section and the lower section of the external wall preferably have approximately the same size, but one section may be larger than the other section.

The fluid reservoir may comprise a light emitting surface for emitting light received from the light source. The light emitting surface may be an internal surface of the reservoir. For example, the light emitting surface may comprise at least part of an inner wall of the reservoir, which is visible to a user through a transparent external window or wall of the reservoir. At least part of the external wall of the fluid reservoir is preferably transparent, and is preferably formed from transparent plastics material, to allow a user to see the volume of working fluid within the fluid reservoir, and so this internal light emitting surface of the fluid reservoir may be visible to the user through the transparent wall or window of the fluid reservoir.

In a preferred embodiment, the light emitting surface is an external surface of the reservoir, and is preferably part of an external wall of the fluid reservoir. In a preferred embodiment, the light emitting surface preferably has one of a curved shape, a convex shape, and a faceted shape. The light emitting surface may have a curvature which is one of ellipsoidal, spheroidal and spherical. The light emitting surface is preferably annular in shape so that it is visible to the user irrespective of the angle or orientation at which the appliance is being held by the user. The light emitting surface preferably extends about the stem.

The fluid reservoir may comprise an inner wall which is connected to the external wall. The inner wall may be annular or tubular in shape, and located around a stem of the appliance so as to provide a sleeve which forms a connection with the stem when the fluid reservoir is mounted on the stem. Both ends of the inner wall may be joined, for example using a welding technique or using an adhesive, to the external wall. Alternatively, the inner wall may be integral with at least part of the external wall. In a preferred embodiment, the inner wall is part of the first, upper housing part of the fluid reservoir, and so is preferably integral with the upper section of the external wall, and is joined to the lower section of the external wall. A fluid port is preferably formed in the lower section of the external wall, which is preferably integral with a bottom wall of the fluid reservoir.

The fluid reservoir preferably comprises a light incident surface for receiving light emitted from the light source. The light incident surface is preferably an external surface of the reservoir, and is preferably part of an external wall of the fluid reservoir.

The light incident surface may preferably located adjacent to the light emitting surface. The light incident surface may be integral with the light emitting surface. For example, a single component of the fluid reservoir, for example, the second, lower housing part of the fluid reservoir, may comprise both the light incident surface and the light emitting surface, and transmit light from the light incident surface to the light emitting surface. The second housing part of the fluid reservoir may thus provide a light transmissive element for conveying light to the light emitting surface. In a preferred embodiment, the bottom wall of the fluid reservoir comprises the light incident surface.

Alternatively, the upper housing part of the fluid reservoir may provide both the light incident surface and the light emitting surface. For example, the inner wall of the fluid reservoir may comprise the light incident surface. The light incident surface may be provided by an annular lower end of the inner wall. The upper housing part of the fluid reservoir may be formed from translucent material so that an upper annular section of the external wall of the fluid reservoir comprises the light emitting surface. As a further alternative, the upper section of the external wall of the fluid reservoir may be formed from opaque material, in which case an annular upper end of the inner wall may provide the light emitting surface. In such an instance, the light emitting surface and the light incident surface are located at opposite ends of the fluid reservoir. The light transmissive element may comprise a tubular light transmissive element extending between the light receiving surface and the light emitting surface. The fluid reservoir may surround the tubular light transmissive element. The fluid reservoir may comprise an opaque inner wall which surrounds the tubular light transmissive element so that only an annular end portion of the light transmissive element is visible to a user.

The light source preferably comprises at least one LED. For example, the light source may comprise a single color LED, for example a green LED, or an RGB LED. Alternatively, the light source may comprise a plurality of LEDs, for example a green LED and a red LED, or a green LED, a red LED and a blue LED. The light source is preferably configured to emit light having a selected one of a plurality of different wavelengths, and wherein the control circuit is arranged to activate the light source to generate light of the selected wavelength to generate a selected one of a plurality of different user alerts. For example, the plurality of different user alerts may comprise at least one of a fluid reservoir empty alert, an over-pressure alert, a time of use alert, a low battery charge alert, and a battery charging alert.

The light source may comprise a UV LED for emitting electromagnetic radiation having an ultra violet (UV) wavelength. The UV radiation emitted from the light source may be emitted into the fluid reservoir by the internal surface of the second lower housing part to sterilize the internal surfaces of the fluid reservoir. During UV sterilization of the fluid chamber, the appliance may be located within a dedicated housing to prevent the user from being exposed to the UV radiation emitted from the light source.

The fluid delivery system preferably comprises a pump, and the control circuit may be arranged to actuate the pump to draw working fluid from the fluid reservoir and eject a burst of working fluid towards the nozzle. As the nozzle is moved between adjacent teeth of the user, the user may depress a button of a user interface provided on the handle to actuate the pump to cause a burst of working fluid to be ejected from the nozzle. Alternatively, the appliance may be configured to actuate the delivery of working fluid to the teeth of the user automatically depending on the magnitude of an output from a sensor for detecting that the nozzle is located within an interproximal gap. For example, the sensor may be in the form of a light detector, such a camera or a light sensor, for receiving light, such a visible light or infrared light, reflected from a user's teeth. As another alternative, the appliance may be configured to actuate the delivery of working fluid to the teeth of the user automatically at a fixed frequency, for example between 0.5 and 5 Hz. The control circuit may be configured to actuate the light source when the pump is actuated to deliver a burst of working fluid to the nozzle.

To facilitate the movement of the nozzle along the teeth of user during use of the appliance, the head preferably comprises means, spaced from the nozzle, for engaging the teeth of the user. For user comfort, the engaging means may be formed from resilient or elastomeric material. The engaging means may have a substantially flat upper surface, a curved upper surface, or a stepped upper surface. For example, the engaging means may have a concave upper surface.

The appliance may be in the form of a dedicated interproximal cleaning appliance for cleaning between the gaps in the user's teeth. For such an appliance, the engaging means may comprise a single resilient member which surrounds the nozzle. Alternatively, the engaging means may comprise a plurality of resilient members arranged adjacent to the nozzle. The resilient members may be located on opposite sides or ends of the head, or arranged about the nozzle. For example, the resilient members may be arranged circumferentially about the nozzle. The resilient member(s) may be formed from elastomeric material.

Alternatively, the appliance may be in the form of a toothbrush which has the additional function of improved interproximal cleaning through the emission of a burst of working fluid into the interproximal gap. Where the appliance is in the form of a toothbrush, the engaging means preferably comprises a plurality of bristles. The bristles are preferably arranged around the nozzle, and may be arranged circumferentially about the nozzle.

The plurality of bristles may be attached to a static section of the head, which section is not moveable relative to the handle. Alternatively, or additionally, a plurality of bristles may be attached to a moveable section of the head, which section is moveable relative to the handle. In a preferred embodiment, the appliance comprises a brush unit comprising a bristle carrier and a plurality of bristles mounted on the bristle carrier, with the bristle carrier being moveable relative to the handle. The brush unit is preferably moveable relative to the nozzle to enable the ends of the bristles to be swept over the surfaces of the teeth of the user. The bristle carrier may translate, rotate, pivot or vibrate relative to the nozzle. A motor may be provided to move the bristle carrier relative to the handle. The control circuit may be arranged to monitor the current drawn by the motor to move the bristle carrier over a user's teeth to provide an indication of the pressure applied to the teeth by the user. Alternatively, the control circuit may monitor directly the pressure applied to either the nozzle or to the bristles as the bristle carrier is moved over the user's teeth, for example, by monitoring the deflection of the nozzle or the bristles. Depending on the magnitude of the detected pressure, the control circuit may generate an overpressure alert signal using the light source, for example by activating a red LED of the light source while the detected pressure is over a preset value.

Features described above in connection with the first aspect of the invention are equally applicable to the second aspect of the invention, and vice versa.

BRIEF DESCRIPTION OF THE DRAWINGS

Preferred features of the present invention will now be described by way of example only with reference to the accompanying drawings, in which.

DETAILED DESCRIPTION OF THE INVENTION

Figure 1A:
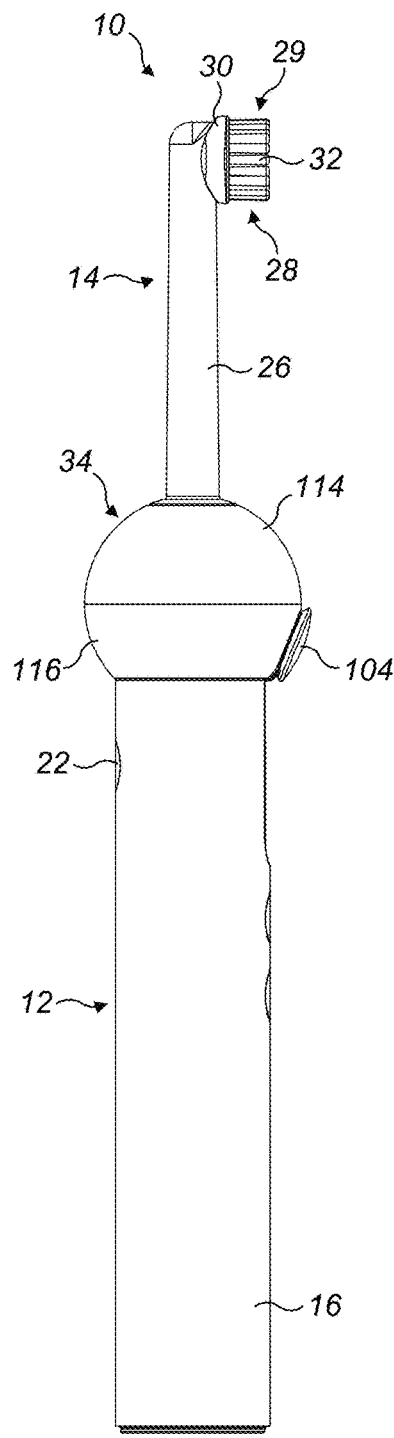
FIG. 1(a) is a right side view of a dental cleaning appliance.
Figure 1B:
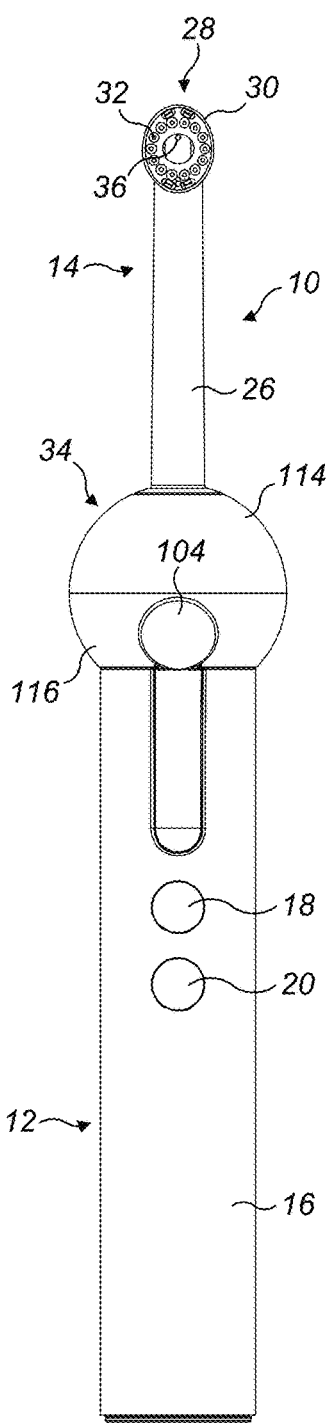
FIG. 1(b) is a front view of the appliance.
Figure 1C:
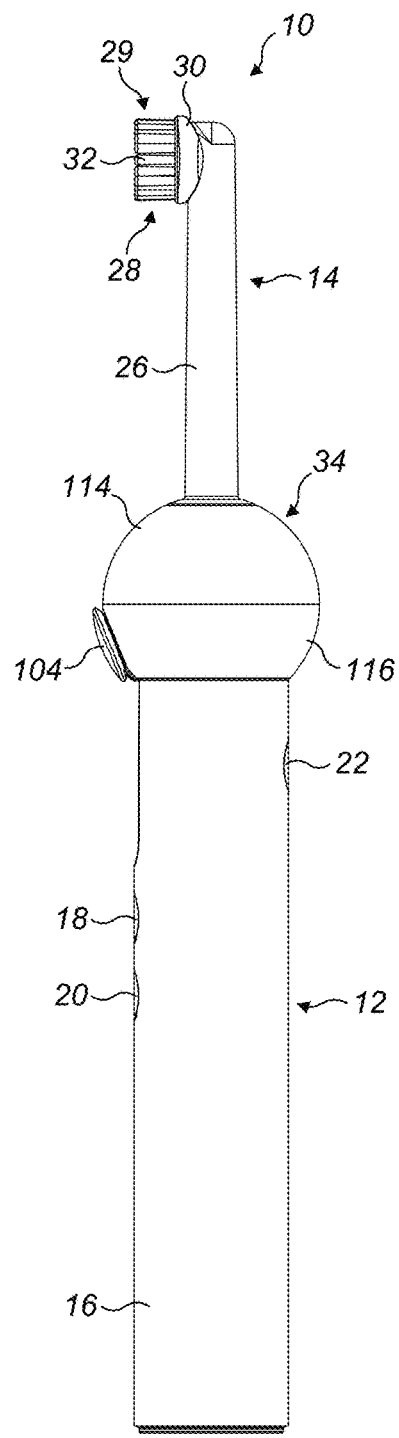
FIG. 1(c) is a left side view of the appliance.

FIGS. 1(a) to 1(c) illustrate external views of an embodiment of a dental cleaning appliance 10. In this embodiment, the appliance is in the form of a handheld appliance, which is in the form of an electric toothbrush having an integrated assembly for dispensing a working fluid for improved interproximal cleaning.

The appliance 10 comprises a handle 12 and a cleaning tool 14. The handle 12 comprises an external body 16 which is gripped by a user during use of the appliance 10. The body 16 is preferably formed from plastics material, and is preferably generally cylindrical in shape. The handle 12 comprises a plurality of user operable buttons 18, 20, 22 which are located within respective apertures formed in the body 16 so as to be accessible to the user. The handle 12 may comprise a display which is positioned so as to be visible to a user during use of the appliance.

The cleaning tool 14 comprises a stem 26 and a head 28. The stem 26 is elongate in shape, which serves to space the head 28 from the handle 12 to facilitate user operability of the appliance 10. In this embodiment, the head 28 of the cleaning tool 14 comprises a brush unit 29, which comprises a bristle carrier 30 and a plurality of bristles 32 mounted on the bristle carrier 30. However, in other embodiments the cleaning tool 14 may be provided without a brush unit 29 so that the appliance is in the form of a dedicated interproximal cleaning appliance for cleaning between the gaps in the user's teeth.

The cleaning tool 14 also comprises a fluid reservoir 34 for storing a working fluid, and a nozzle 36 for delivering one or more bursts of working fluid to the teeth of the user during use of the appliance 10. The fluid reservoir 34 is connected to the stem 26. The fluid reservoir 34 extends at least partially around the stem 26. In this embodiment which includes a brush unit 29, the brush unit 29 extends at least partially around the nozzle 36.

Figure 2:
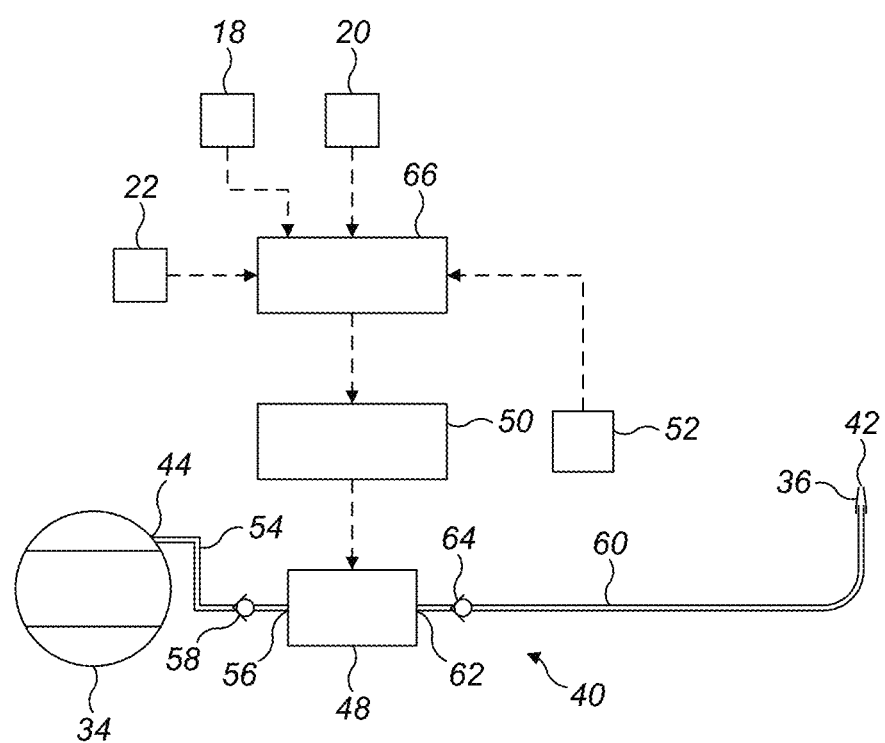
FIG. 2 illustrates schematically components of a fluid delivery system for delivering a burst of a working fluid to the teeth of a user.

The nozzle 36 forms part of a fluid delivery system 40 for receiving working fluid from the fluid reservoir 34 and for delivering bursts of working fluid to the teeth of a user during use of the appliance 10. The tip of the nozzle 36 comprises a fluid outlet 42 through which a burst of working fluid is delivered to the teeth of the user. The fluid delivery system 40 is illustrated schematically in FIG. 2. In overview, the fluid delivery system 40 comprises a fluid inlet 44 for receiving working fluid from the fluid reservoir 34. In this embodiment, the working fluid is a liquid working fluid, which is preferably water. The fluid delivery system 40 comprises a pump assembly 46 for drawing working fluid from the fluid reservoir 34 through the fluid inlet 44, and for delivering a burst of working fluid to the nozzle 36. The pump assembly 46 is located within the handle 12, and comprises a positive displacement pump 48 and a drive for driving the pump 48. The drive preferably comprises a motor 50. A battery 52 for supplying power to the motor 50 is also located in the handle 12. The battery 52 is preferably a rechargeable battery.

Figure 8:
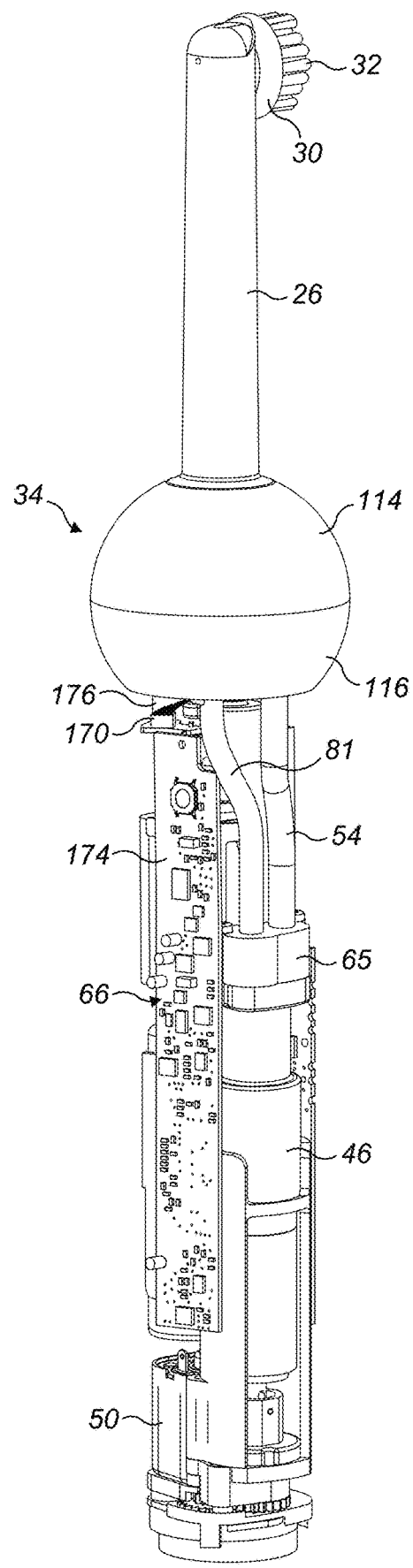
FIG. 8 is a rear perspective view of the appliance, with the body and buttons of the handle removed.

A first conduit 54 connects the fluid inlet 44 of the fluid delivery system 40 to a fluid inlet 56 of the pump 48. A first one-way valve 58 is located between the fluid inlet 44 and the pump 48 to prevent water from returning to the fluid reservoir 34 from the pump 48. A second conduit 60, which is this embodiment comprises a plurality of sections, connects a fluid outlet 62 of the pump 48 to the nozzle 36. A second one-way valve 64 is located between the pump 48 and the nozzle 34 to prevent water from returning to the pump 48. As shown in FIG. 8, the valves 58, 64 are housed within a valve manifold 65 mounted on the pump 48. A control circuit 66 controls the actuation of the motor 50, and so the motor 50 and the control circuit 66 provide a drive for driving the pump 48. The battery 52 supplies power to the control circuit 66. The control circuit 66 includes a motor control circuit, which supplies power to the motor 50.

In this embodiment, the control circuit 66 receives signals generated when the user depresses the buttons 18, 20, 22 located on the handle 12 of the appliance 10. Alternatively, or additionally, the control circuit 66 may receive signals which are generated by a sensor located within the appliance, or which are received from a remote device, such as a display or a personal device. For brevity, in the following description the control circuit 66 receives signals which are generated when the user operates one of the buttons 18, 20, 22.

Figure 3:
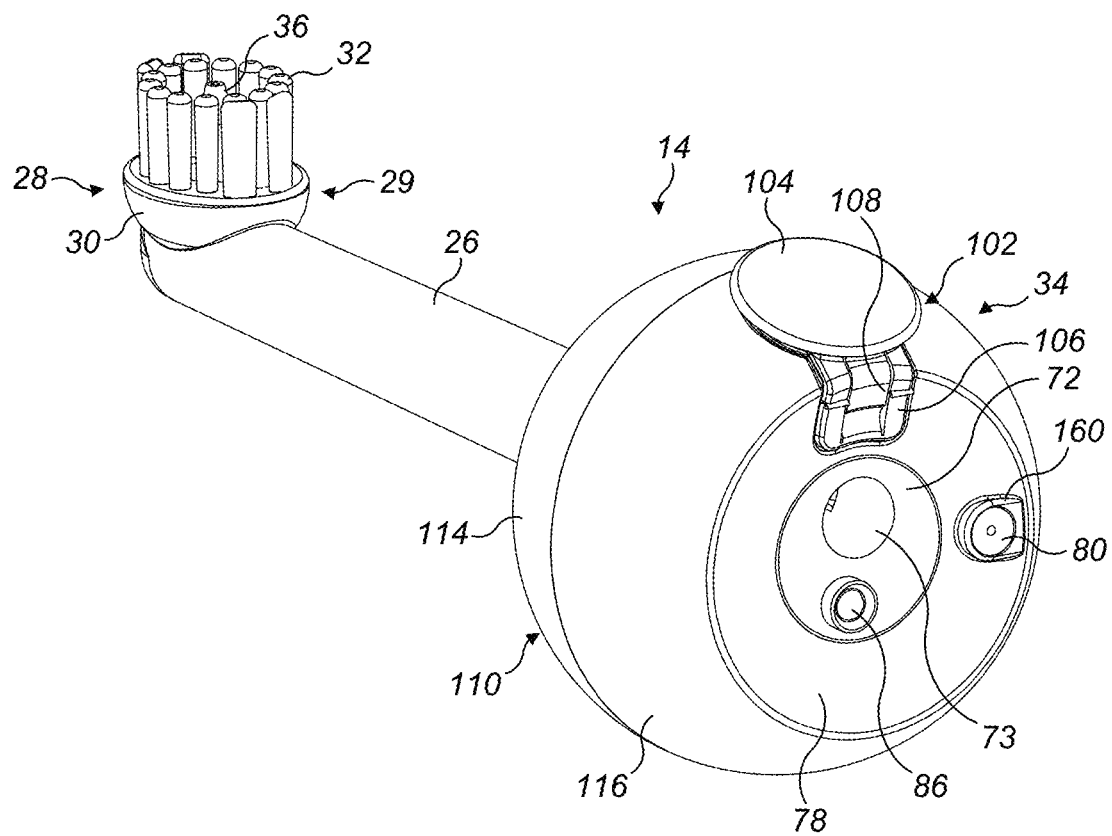
FIG. 3 is a right side perspective view, from above, of a cleaning tool of the appliance.
Figure 4:
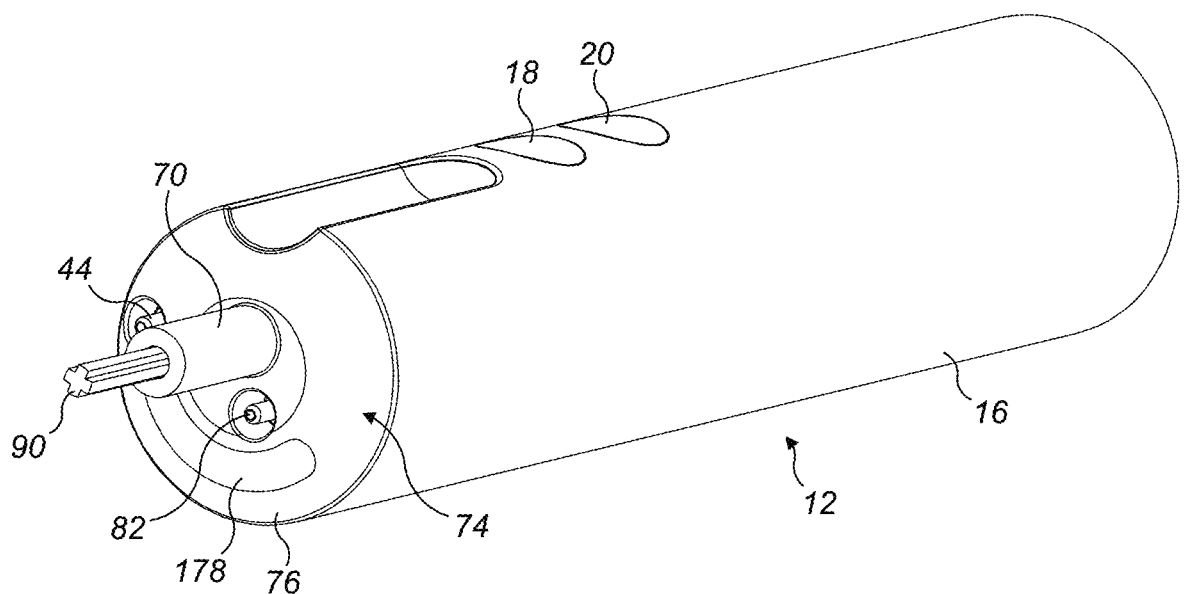
FIG. 4 is a right side perspective view, from above, of a handle of the appliance.
Figure 5:
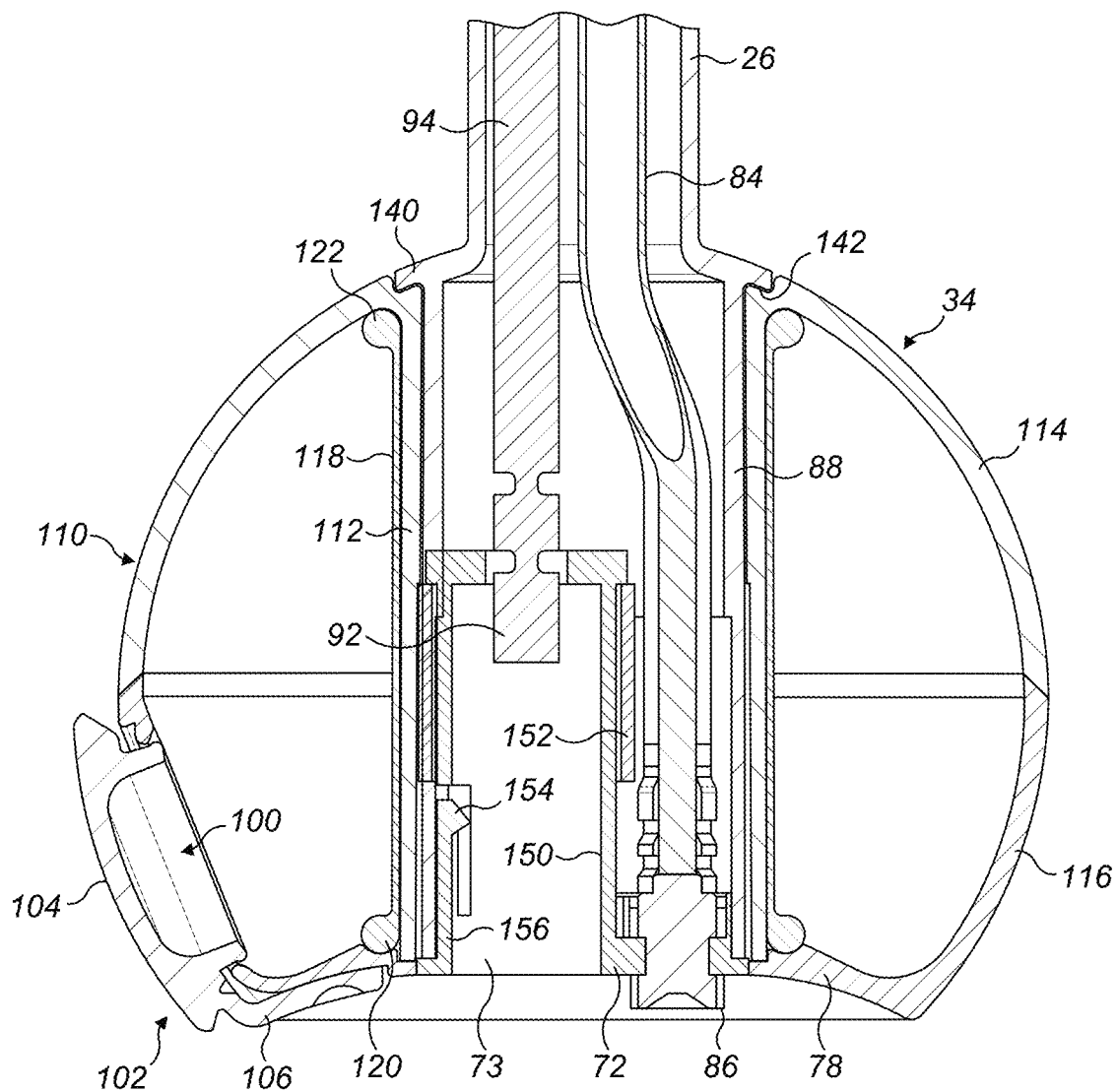
FIG. 5 is a side sectional view of part of the cleaning tool.

The cleaning tool 14 is detachably connected to the handle 12. With reference to FIGS. 3 to 5, the handle 12 comprises a male connector, preferably in the form of a spigot 70, which is received by a complementary female connector, preferably in the form of a recessed connector 72, of the cleaning tool 14. The recessed connector 72 defines a generally cylindrical recess 73 for receiving the spigot 70. The spigot 70 preferably protrudes outwardly from an end surface 74 of the body 16, and preferably in a direction which is parallel to a longitudinal axis of the handle 12. The end surface 74 defines an annular seat 76 for receiving an annular bottom wall 78 of the fluid reservoir 34 when the cleaning tool 14 is mounted on the handle 12. The annular seat 76 comprises the fluid inlet 44 of the fluid delivery system 40. The fluid inlet 44 receives fluid from a reservoir fluid outlet port 80 of the fluid reservoir 34 when the cleaning tool 14 is mounted on the handle 12.

The second conduit 60, which connects the fluid outlet 62 of the pump 48 to the nozzle 36, comprises a handle conduit section 81 located within the handle 12, and a cleaning tool conduit section located within the cleaning tool 14. The handle conduit section 81, shown in FIG. 8, extends from the fluid outlet 62 of the pump 48 to a handle fluid outlet port 82 located adjacent to the spigot 70. The cleaning tool conduit section 84 extends from a cleaning tool fluid inlet port 86 to the nozzle 36. The cleaning tool fluid inlet port 86 protrudes from the base of the recessed connector 72. The recessed connector 72 is housed within, and connected to, a relatively wide base section 88 of the stem 26.

As mentioned above, the cleaning tool 14 includes a bristle carrier 30 which is moveable relative to the stem 26. The appliance 10 comprises a drive mechanism for driving the movement of the bristle carrier 30 relative to the stem 26. The drive mechanism comprises a transmission unit connected to the bristle carrier 30, and a drive unit for driving the transmission unit to move the bristle carrier 30 relative to the stem 26.

The handle 12 comprises the drive unit of the drive mechanism. The drive unit comprises a motor, preferably in the form of a dc motor, which is actuated by the control circuit 66 in response to the user depression of one or more of the buttons of the handle 12. The motor of the drive unit is connected via a gear train to a rotatable drive unit coupling member 90 which protrudes outwardly from the spigot 70, and which rotates relative to the body 16 upon actuation of the motor of the drive unit.

The cleaning tool 14 comprises the transmission unit of the drive mechanism. The transmission unit comprises a transmission unit coupling member 92 which couples with, and preferably receives, the drive unit coupling member 90 when the cleaning tool 14 is connected to the handle 12. The transmission unit coupling member 92 is connected to, and is preferably integral with, one end of a connecting rod 94 housed within the stem 26. The other end of the connecting rod 94 is connected to the side surface of the bristle carrier 30 so that periodic rotation of the connecting rod 94 about a 15° angle results in a 15° sweeping movement of the bristle carrier 30 relative to the stem 26.

The fluid reservoir 34 is mounted on, and extends at least partially around, the stem 26 of the cleaning tool 14. In this embodiment, the fluid reservoir 34 is annular in shape, and so surrounds the stem 26. The fluid reservoir 34 is preferably located at or towards the end of the stem 26 which is remote from the head 28, and so in this embodiment extends around the base section 88 of the stem 26. The fluid reservoir 34 preferably has a capacity in the range from 5 to 50 ml, and in this embodiment has a capacity of 25 ml.

The fluid reservoir 34 is filled through a reservoir fluid inlet port 100 formed in the external wall of the fluid reservoir 34. The fluid inlet port 100 is preferably formed in an annular external side wall 110 of the fluid reservoir 34. The reservoir fluid inlet port 100 is sealed by a closure member 102. The closure member 102 is moveable relative to the fluid reservoir 34 between a closed position, as shown in FIG. 3, in which the closure member 102 inhibits the leakage of working fluid from the reservoir fluid inlet port 100, and an open position. In this embodiment, the closure member 102 is pivotably connected to the fluid reservoir 34. The closure member 102 is locatable within, and forms a fluid-tight seal against, the reservoir fluid inlet port 100. The closure member 102 comprises a head 104 which may be gripped by the user to move the closure member 102 from the closed position to the open position, and which may be pushed by the user towards the reservoir fluid inlet port 100 to return the closure member 102 to the closed position.

The closure member 102 is connected to the fluid reservoir 34 by a pair of arms 106. One end of each arm 106 is connected to the closure member 102, and the other end of each arm 106 is connected to the fluid reservoir 34. In this embodiment, the arms 106 are integral with the closure member 102, with a portion of each arm 106 which is remote from the closure member 102 being connected to the bottom wall 78 of the fluid reservoir 34, for example using an adhesive or by welding. Each arm 106 comprises a hinge 108, which may be formed from a part of the arm 106 which has a locally reduced thickness, to enable the part of the arm 106 which is connected to the closure member 102 to pivot relative to the other part of the arm 106 which is connected to the fluid reservoir 34.

To fill the fluid reservoir 34, the user detaches the cleaning tool 14 from the handle 12, as explained in more detail below, grips the head 104 of the closure member 102 between finger and thumb and pulls it out from the reservoir fluid inlet port 100. The fluid reservoir 34 may then be filled by the user, for example by locating the reservoir fluid inlet port 100 beneath a running tap. Once the fluid reservoir 34 has been filled, the user pushes the head 104 of the closure member 102 back into the reservoir fluid inlet port 100, and reconnects the cleaning tool 14 to the handle 12. The pivoting connection between the closure member 102 and the bottom wall 78 of the fluid reservoir 34 inhibits accidental loss of the closure member 102 while the reservoir fluid inlet port 100 is exposed, and enables the joint between the closure member 102 and the fluid reservoir 34 to be located between the handle 12 and the fluid reservoir 34 when the cleaning tool 14 is mounted on the handle 12. As shown in FIG. 3, the lower parts of the arms 106 of the closure member 102 are located within a recessed section of the bottom wall 78 of the fluid reservoir 34 when the closure member 102 is in its closed position so that the bottom surfaces of the lower parts of the arms 106 are substantially flush with the bottom wall 78 of the fluid reservoir 34.

At least part of the external wall 110 of the fluid reservoir 34 is preferably transparent to allow a user to observe the contents of the fluid reservoir 34, and so assess whether the fluid reservoir 34 requires replenishment prior to the desired use of the appliance 10. The external wall 110 preferably has a shape which is symmetrical about the longitudinal axis of the cleaning tool 14. The external wall 110 preferably has a curved shape, more preferably a convex curved shape, but alternatively the external wall 110 may have a polygonal or faceted shape. In this embodiment, the external wall 110 has a spherical curvature. As described below, the fluid reservoir 34 is mounted on the relatively wide base section 88 of the stem 26, and so the external wall 110 has opposed circular apertures which are centred on the longitudinal axis of the cleaning tool 14 to allow the base section 88 of the stem 26 to pass therethrough.

The fluid reservoir 34 further comprises an inner wall 112 which is connected to the external wall 110. The inner wall 112 is tubular in shape. The ends of the inner wall 112 are preferably circular in shape, and are connected to the external wall 110 so as to form a fluid-tight seal between the external wall 110 and the inner wall 112. In this embodiment, the fluid reservoir 34 is formed from two housing parts. A first housing part 114 comprises an upper section of the external wall 110 and the inner wall 112, and so the upper end of the inner wall 112 is integral with an upper section of the external wall 110. A second housing part 116 comprises a lower section of the external wall 110 and the bottom wall 78 of the fluid reservoir 34. In this embodiment, the first housing part 114 is formed from relatively transparent material, whereas the second housing part 116 is formed from relatively translucent material.

The fluid reservoir 34 also comprises a diaphragm 118. The diaphragm 118 is tubular in shape, and surrounds the inner wall 112 of the fluid reservoir 34. The ends 120, 122 of the diaphragm 118 may be connected to the external wall 110, or to the inner wall 112. The diaphragm 118 thus has an external surface 124 which faces the external wall 110 of the fluid reservoir 34, and which defines with the external wall 110 the capacity of the fluid reservoir 34. As the diaphragm 118 is visible to the user through at least part of the external wall 110, the external surface 124 of the diaphragm 118 may bear an identifier for user identification of the cleaning tool 14. For example, the identifier may be a coloured portion of the external surface 124 of the diaphragm 118, or one or more alphanumeric characters moulded or otherwise formed on the external surface 124 of the diaphragm 118.

Figure 6A:
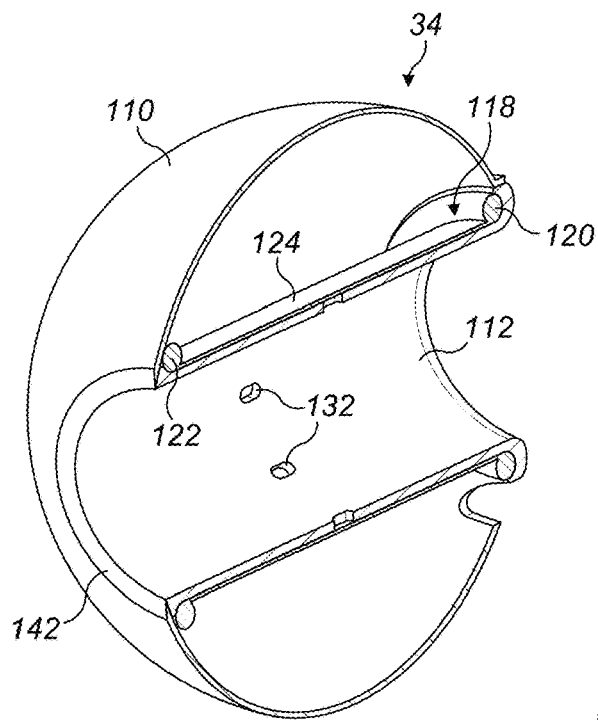
FIG. 6(a) is a sectional schematic view of a fluid reservoir of the cleaning tool, and with a diaphragm of the fluid reservoir in a fully contracted configuration.
Figure 6B:
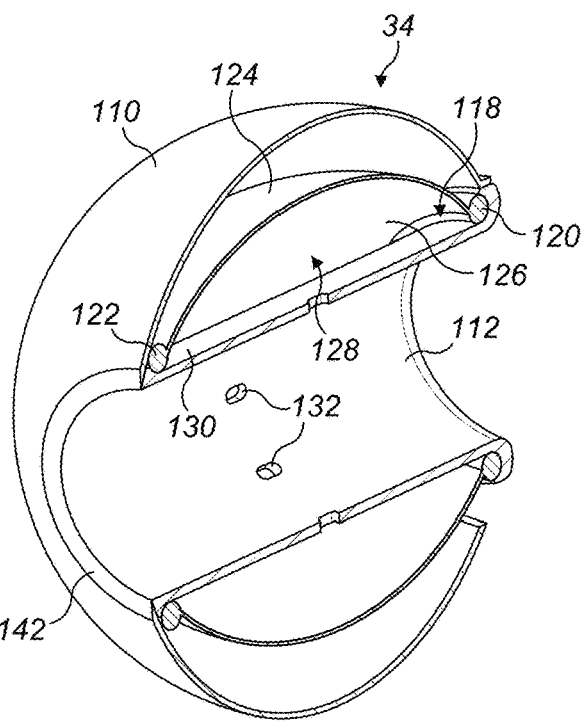
FIG. 6(b) is a similar view to FIG. 6(a) but with the diaphragm in a partially expanded configuration.
Figure 6C:
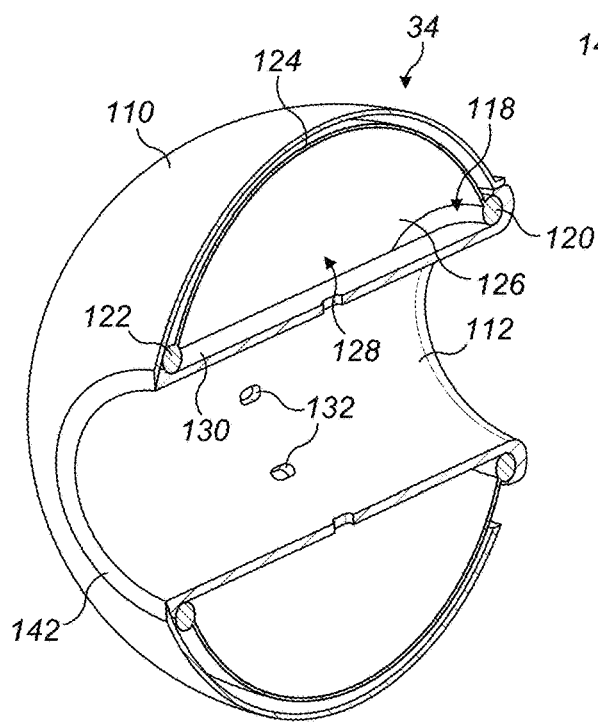
FIG. 6(c) is a similar view to FIG. 6(a) but with the diaphragm in an almost fully expanded configuration.

FIGS. 5 and 6(*a*) illustrates the fluid reservoir 34 when it has been filled with working fluid. The thickness of the diaphragm 118, and the material from which the diaphragm 118 is formed, are selected so that at least part of the diaphragm 118 is moveable relative to the external wall 110 in response to a pressure differential which is established across the diaphragm 118 as working fluid is drawn from the fluid reservoir 34 by the pump 48. In this embodiment, the diaphragm 118 is expandable in response to a pressure differential which is generated across the surfaces 124, 126 of diaphragm 118 as working fluid is drawn from the fluid reservoir 34. FIG. 6(*a*) illustrates the diaphragm 118 in a fully contracted configuration, or state, in which the capacity of the fluid reservoir 34 is maximised.

In this embodiment, the cleaning tool 14 comprises an expansion chamber 128 which is located adjacent to the inner wall 112. The expansion chamber 128 has a volume which increases as the volume of the fluid reservoir 34 decreases. In this embodiment, the expansion chamber 128 is open to the atmosphere to allow atmospheric air to enter the expansion chamber 128 as the inner wall 112 moves towards the external wall 110 as working fluid is supplied to the fluid delivery system 100. The expansion chamber 128 is shown in FIGS. 6(*b*) and 6(*c*), which illustrate the diaphragm 118 in a partially expanded configuration, and in an almost fully expanded configuration, respectively. The expansion chamber 128 is delimited by the internal surface 126 of diaphragm 118, and the external surface 130 of the inner wall 112. One or more apertures or ports 132 are formed in the inner wall 112 to allow atmospheric air to enter the expansion chamber 128, for example, from an air flow path which extends between the stem 26 and the inner wall 112, with expansion of the diaphragm 118.

As the diaphragm 118 expands towards its fully expanded configuration, the size and shape of the diaphragm 118 approaches that of the external wall 110. In other words, when the diaphragm 118 is in a fully expanded configuration, which occurs when the fluid reservoir 34 is substantially empty, the size and the shape of the diaphragm 118 are substantially the same as the size and the shape of the external wall 110 of the fluid reservoir 34. Thus, the maximum volume of the expansion chamber 128 is preferably substantially the same as the maximum volume of the fluid reservoir 34.

As mentioned above, the fluid reservoir 34 is mounted on the relatively wide base section 88 of the stem 26. To mount the fluid reservoir 34 on the stem 26, the circular aperture formed in the first housing part 114 of the fluid reservoir 34 is aligned with the free end of the base section 88 of the stem 26, and the fluid reservoir 34 is pushed on to the stem 26. The internal surface of the inner wall 112 of the fluid reservoir 34 bears against the base section 88 of the stem 26 so that frictional forces therebetween prevent the fluid reservoir 34 from falling from the stem 26. The movement of the fluid reservoir 34 along the stem 26 is restricted by a flange 140 which extends radially outwardly from the stem 26, and is located at the upper end of the base section 88 of the stem 26. The flange 140 is annular in shape, and is arranged to engage an annular planar end portion or recess 142 of the first housing part 114 of the fluid reservoir 34. When the recess 142 of the fluid reservoir 34 engages the flange 140 of the stem 26, the fluid reservoir 34 is in the correct axial position along the stem 26 for the subsequent connection of the reservoir fluid outlet port 80 to the fluid inlet 44 of the fluid delivery system 40. To facilitate angular alignment of the fluid reservoir 34 relative to the stem 26, the flange 140 and the recess 142 may be provided a non-annular shape, for example a C-shape. Otherwise, the fluid reservoir 34 may be visually angularly aligned by the user relative to the head 28, for example so that the head 104 of the closure member 102 is aligned with the nozzle 36.

Figure 7:
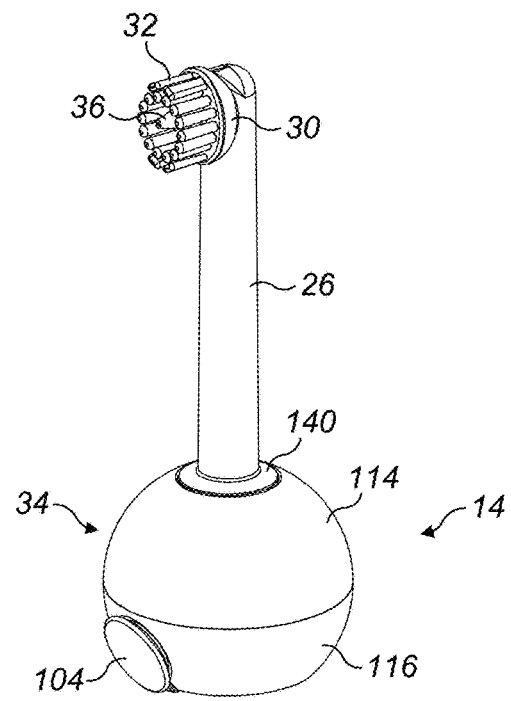
FIG. 7 is a perspective view of the appliance, with the cleaning tool detached from the handle.
Figure 7:
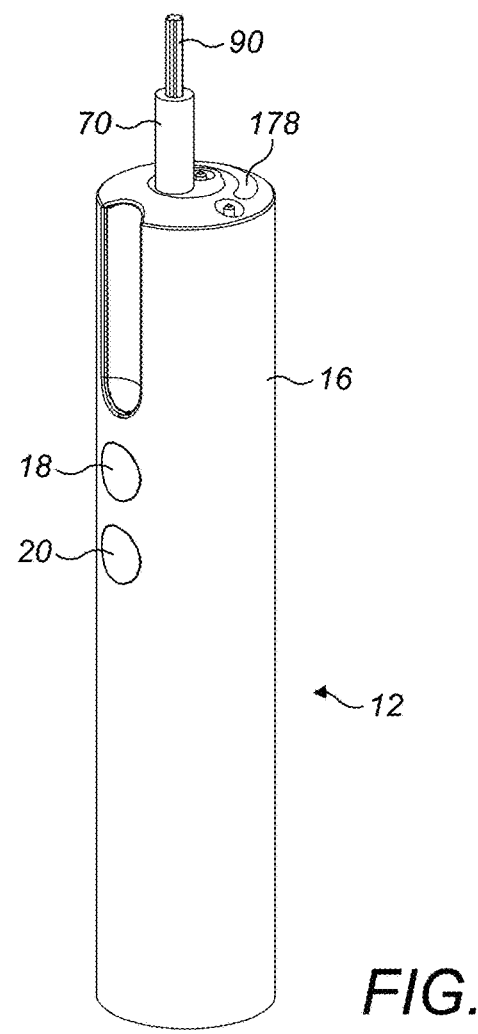

To mount the cleaning tool 14 on the handle 12, as shown in FIG. 7 the spigot 70 of the handle 12 is aligned with the recess 73 formed in the connector 72 of the cleaning tool 14, and the handle fluid outlet port 82 located adjacent to the spigot 70 is aligned with the cleaning tool fluid inlet port 86 of the cleaning tool 14. The cleaning tool 14 is then pushed on to the spigot 70 so that the handle fluid outlet port 82 connects to the cleaning tool fluid inlet port 86, and so that the fluid reservoir 34 engages the annular seat 76 to connect the reservoir fluid outlet port 80 to the fluid inlet 44 of the fluid delivery system 40. The internal surface 150 of the connector 72 of the stem 26 bears against the external surface of the spigot 70 so that frictional forces therebetween retain the stem 26 on the handle 12. The connector 72 is preferably formed from resilient plastics material which flexes as the connector 72 is pushed on to the spigot 70 to increase the frictional forces therebetween. A spring clip 152 may be provided at least partially about the connector 72 for urging the internal surface 150 of the connector 72 against the spigot 70. To prevent the cleaning tool 14 from becoming accidentally dislodged from the handle 12, the connector 73 may comprises a detent 154 mounted on an arm 156 which is hingedly connected to the connector 72. For example, the arm 156 may be integral with the connector 72, and connected to the remainder of the connector 72 by an elastic hinge. As the cleaning tool 14 is pushed on to the spigot 70, the detent 154 enters a recess (not shown) formed on the external surface of the spigot 70. With reference to FIGS. 3 and 4, to inhibit accidental rotation of the fluid reservoir 34 relative to the handle 12, the bottom wall 78 of the fluid reservoir 34 may be provided with a male connector 160 which engages with a female connector 162 disposed on the annular seat 76 of the handle 12. In this embodiment, the male connector 160 at least partially surrounds the cleaning tool fluid inlet port 86, and the female connector 162 surrounds the handle fluid outlet port 82. Alternatively, the fluid reservoir 34 may be provided with a female connector which receives a male connector located on the handle 12 as the cleaning tool 14 is connected to the handle 12.

With reference now to FIGS. 4 and 8 to 10, the handle 12 includes a light source 170 for generating a visual alert for a user of the appliance 10. The light source 170 is located within the handle 12, and is connected to the control circuit 66 which controls the activation of the light source 170. The light source 170 is preferably an LED light source, and preferably comprises a plurality of LEDs of respective different colours. In this embodiment, the light source 170 comprises a green LED, a blue LED and a red LED. A selected one or more of the LEDs may be selectively activated by the control circuit 66 to generate a light output of a chosen colour. For example, the control circuit 66 may generate a red light output to form an alert which indicates that the user is applying too much pressure to the brush carrier 30 during a cleaning process. This alert may be generated by the control circuit 66 through monitoring the current drawn by the motor for driving the movement of the brush carrier 30. As another example, the control circuit 66 may be arranged to generate a green light output periodically during a cleaning process, for example every 30 seconds to advise a user to start to clean a different quadrant of the mouth. As a further example, the control circuit 66 may generate a continuous light output, for example a green light output, to indicate a low battery level to the user.

Figure 9:
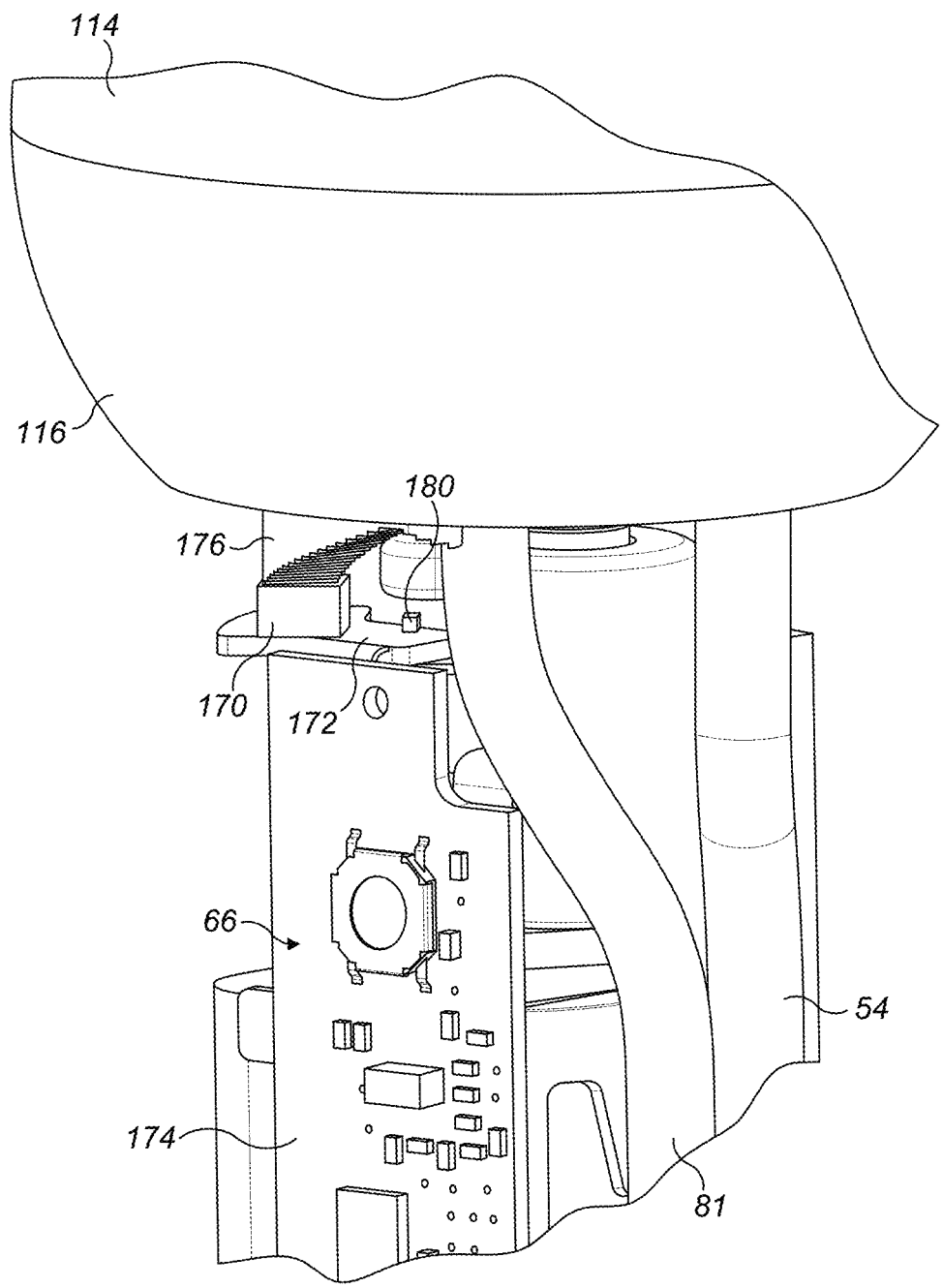
FIG. 9 is a close-up of part of FIG. 8.
Figure 10:
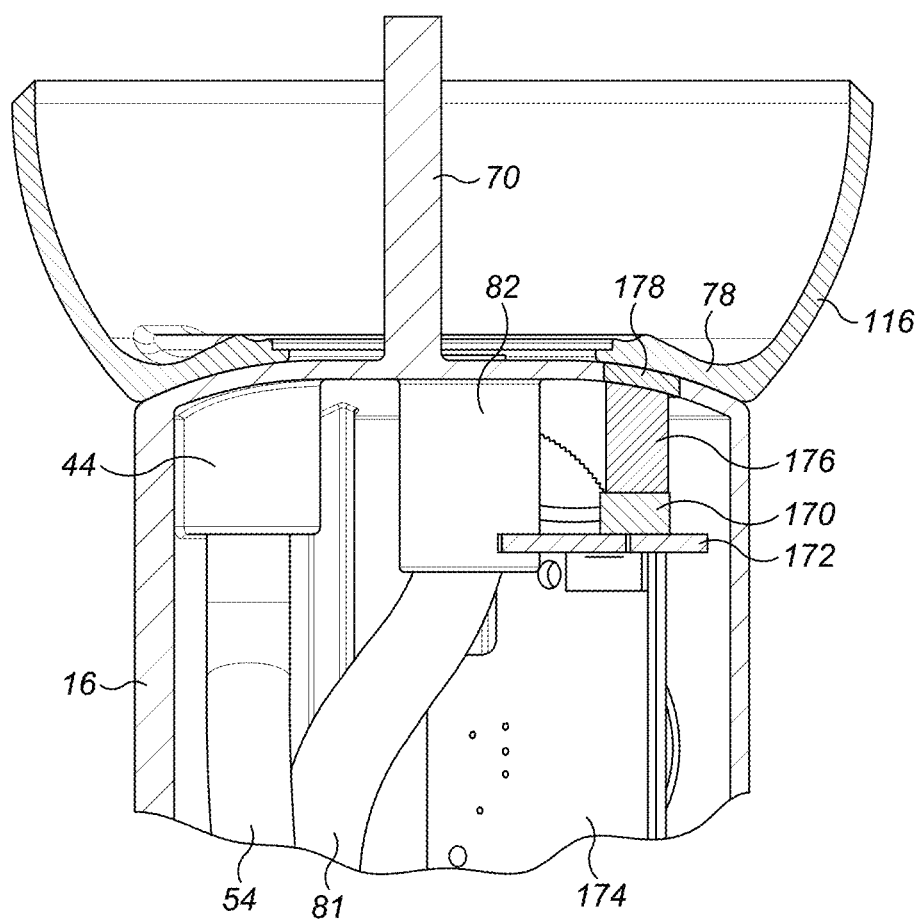
FIG. 10 is a side sectional view of the handle and a housing part of the fluid reservoir.

The light source 170 is mounted within the handle 12 so as to emit light towards the end surface 74 of the body 16 of the handle 12. As shown in FIGS. 8 to 10, the light source 170 is mounted on a printed circuit board 172 which is in turn mounted generally at a right angle to the printed circuit board 174 of the control circuit 66.

The handle 12 comprises a light transmissive element for transmitting the light output from the light source 170 towards the end surface 74 of the handle 12. In this example, the handle 12 comprises a light pipe 176 for receiving the light emitted from the light source 170, and for conveying the received light to a light emitter 178 for emitting light from the handle 12. The light emitter 178 is generally planar in shape, and is formed from transparent or translucent material. The light emitter 178 is preferably a separate component which is connected to the body 16 of the handle 12. For example, the light emitter 178 may form a snap-fit connection with the body 16 of the handle 12, or the body 16 of the handle 12 may be overmoulded on to the light emitter 178. In this embodiment, the light emitter 178 is located on the end surface 176 of the handle 12. The light emitter 178 preferably has a curved or arcuate shape so as to extend partially about the spigot 70 of the handle 12.

The light pipe 176 has a light incident surface for receiving light from the light source 170 and a light emitting surface for emitting light towards the light emitter 178. The light emitting surface of the light pipe 176 preferably has substantially the same shape as the light emitter 178. The light incident surface of the light pipe 176 preferably has a stepped profile so that light received by the light pipe 176 is reflected internally within the light pipe 176 to generate a light output at the light emitting surface of the light pipe 176 which substantially uniformly illuminates the light emitter 178.

The light emitter 178 is positioned on the end surface 74 of the handle 12 so that the light emitter 178 is not exposed when the cleaning tool 14 is mounted on the handle 12, but is instead fully covered by the fluid reservoir 34. The light emitter 178 is thus arranged to illuminate the fluid reservoir 34. With reference to FIG. 10, the external surface of the bottom wall 78 of the (translucent) second housing part 116 of the fluid reservoir 34 provides a light incident surface for receiving light emitted by the light emitter 17. The light received by the bottom wall 78 is conveyed throughout the second housing part 116 to be emitted from the internal and the external surfaces of the second housing part 116. When the cleaning tool 14 is mounted on the handle 12, the bottom wall 78 of the fluid reservoir 34 is preferably located adjacent to, and more preferably engages the light emitter 178 to minimise losses as light passes from the handle 12 to the fluid reservoir 34.

To operate the appliance 10, the user presses buttons 18, 20, 22 located on the handle 12. The user switches on the appliance 10 by depressing button 18, the action of which is detected by the control circuit 66. The user may select a mode of operation of the appliance 10 by depressing button 20. For example, through pressing button 20 once, the control circuit 66 may activate the motor to move the brush unit 29 relative to the handle 12. Pressing that button 20 again may switch off the motor. When the button 22 is pressed, a burst of water is emitted from the nozzle 36. The control circuit 66 activates the pump 48 to urge a volume of water from a fluid chamber of the pump 48 to the nozzle 36, and to replenish the fluid chamber through drawing a volume of water from the fluid reservoir 34.

During use of the appliance 10, the control circuit 66 is configured to generate visual alerts to the user through the illumination of the translucent second housing part 116 of the fluid reservoir 34. The control circuit 66 may be configured to generate a visual alert at periodic intervals, for example every 30 seconds, during a cleaning process to advise the user to clean a different quadrant of the mouth. To generate this alert, the control circuit 66 activates the green LED of the light source 170. The light emitted from the light source 170 is transmitted through the light pipe 176 to the light emitter 178, from which the light is emitted to illuminate the second housing part 116 of the fluid reservoir 34 to generate a visual alert for the user.

The various connections between the handle 12, the stem 26 and the fluid reservoir 34 enable the appliance 10 to be readily dismantled by the user, for example to allow components of the appliance 10 to be replaced, for example due to wear. To replace the cleaning tool 14, the user grasps the stem 26 or the fluid reservoir 34 with one hand, and the handle 12 with the other hand, and pulls the cleaning tool 14 away from the handle 12. Under the force applied by the user, the detent 154 moves away from the recess located on the external surface of the spigot 70 to enable the cleaning tool 14 to be detached from the handle 12. If required, the user may then detach the fluid reservoir 34 from the stem 26 by pulling the fluid reservoir 34 from the handle 12.

To prevent a user from being exposed to light emitted from the handle 12 when the cleaning tool 14 is removed from the handle 12, the control circuit 66 is preferably arranged to activate the light source 170 only when the cleaning tool 14 is mounted on the handle 12. In this embodiment, the appliance 10 comprises an interlock which prevents the light source 170 from being activated when the cleaning tool is not located on the handle. The interlock comprises a magnet (not shown) which is located in the cleaning tool 14, for example within the stem 26 of the cleaning tool 14, and a sensor 180, for example a Hall effect sensor, which is located within the handle 12 and connected to the control circuit 66. As an alternative to providing a magnet within the cleaning tool 14, a lower part of the stem 26, or a component located within the stem 26, may be formed from magnetic material. The control circuit 66 is arranged to detect the presence of the cleaning tool 14 on the handle 12 from the variation in the magnetic field experienced by the sensor 180, and thus from a variation in an output from the sensor 180.

The invention claimed is:

1. A dental cleaning appliance comprising:
    a handle;
    a fluid reservoir for storing working fluid;
    a fluid delivery system for receiving the working fluid from the fluid reservoir and delivering the working fluid to the teeth of a user during use, the fluid delivery system comprising a nozzle for delivering the working fluid to the teeth of the user;
    a light source located within the handle and external to the fluid reservoir for illuminating at least part of the fluid reservoir;
    a light emitting surface located on an end surface of the handle which faces the fluid reservoir, the light emitting surface emitting light emitted from the light source for illuminating the at least part of the fluid reservoir; and
    a control circuit for activating the light source.

2. The appliance of claim 1, further comprising a stem extending between the handle and the nozzle, and wherein the fluid reservoir is connected to the stem.

3. The appliance of claim 2, wherein the stem is detachably connected to the handle.

4. The appliance of claim 3, wherein the control circuit is configured to inhibit the activation of the light source when the stem is detached from the handle.

5. The appliance of claim 1, comprising a light pipe located within the handle for conveying light emitted from the light source towards the fluid reservoir.

6. The appliance of claim 1, wherein the fluid reservoir covers the light emitting surface of the handle.

7. The appliance of claim 6, wherein the end surface of the handle is concave in shape.

8. The appliance of claim 1, wherein the fluid reservoir comprises a light emitting surface for emitting light received from the light source.

9. The appliance of claim 8, wherein the light emitting surface is an external surface of the fluid reservoir.

10. The appliance of claim 8, wherein the light emitting surface forms part of an external wall of the fluid reservoir.

11. The appliance of claim 10, wherein said part of the external wall of the fluid reservoir is formed from translucent material.

12. The appliance of claim 8, wherein the light emitting surface has one of a curved shape, a convex shape, and a faceted shape.

13. The appliance of claim 8, wherein the light emitting surface has a curvature which is one of ellipsoidal, spheroidal and spherical.

14. The appliance of claim 8, wherein the light emitting surface is annular in shape.

15. The appliance of claim 8, wherein the fluid reservoir comprises a light incident surface which is illuminated by the light source, and wherein a translucent housing part of the fluid reservoir comprises the light incident surface and the light emitting surface.

16. The appliance of claim 1, wherein the fluid reservoir comprises a light incident surface which is illuminated by the light source.

17. The appliance of claim 16, wherein the light incident surface is an external surface of the reservoir.

18. The appliance of claim 17, wherein the light incident surface forms part of an external wall of the fluid reservoir.

19. The appliance of claim 16, wherein a bottom wall of the fluid reservoir comprises the light incident surface.

20. The appliance of claim 1, wherein the light source comprises at least one LED.

21. The appliance of claim 1, wherein the light source is configured to emit light having a selected one of a plurality of different wavelengths, and wherein the control circuit is arranged to activate the light source to generate light of the selected wavelength to generate a selected one of a plurality of different user alerts.

* * * * *